United States Patent
Fan et al.

(10) Patent No.: US 10,073,554 B2
(45) Date of Patent: Sep. 11, 2018

(54) TOUCH SCREEN AND DISPLAY APPARATUS WITH WAVY SHAPED STRIP ELECTRODES

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Jun Fan, Beijing (CN); Cheng Li, Beijing (CN); Xueguang Hao, Beijing (CN); Jian Sun, Beijing (CN); Jian Li, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 14/904,573

(22) PCT Filed: May 23, 2015

(86) PCT No.: PCT/CN2015/079631
§ 371 (c)(1),
(2) Date: Jan. 12, 2016

(87) PCT Pub. No.: WO2016/119345
PCT Pub. Date: Aug. 4, 2016

(65) Prior Publication Data
US 2016/0370920 A1    Dec. 22, 2016

(30) Foreign Application Priority Data
Jan. 26, 2015 (CN) .......................... 2015 1 0038860

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC .... G06G 3/0416; G06G 3/0412; G06G 3/044; G06F 3/02; G06F 3/041; G06F 3/045;
(Continued)

(56) References Cited

U.S. PATENT DOCUMENTS

2013/0222297 A1* 8/2013 Adachi ................... G06F 3/041
345/173
2014/0293159 A1   10/2014 Adachi
(Continued)

FOREIGN PATENT DOCUMENTS

| CN | 103092417 A | 5/2013 |
| CN | 103294256 A | 9/2013 |

(Continued)

OTHER PUBLICATIONS

First Chinese Office Action dated Jan. 17, 2017; Appln. No. 201510038860.9.
(Continued)

*Primary Examiner* — Pegeman Karimi
(74) *Attorney, Agent, or Firm* — Ladas & Parry LLP

(57) ABSTRACT

A touch screen and a display apparatus. The touch screen comprises first strip electrodes and second strip electrodes which are arranged intersecting with one another on different layers, and edges on both sides of a first electrode positioned on an upper layer of the second strip electrode in an extending direction have a wavy structure, and an included angle between respective polylines forming the wavy structure and the extending direction of the first strip
(Continued)

electrode is an acute angle. In a touch period, the first strip electrodes are loaded with touch scanning signals, and the second strip electrodes couple voltage signals of the touch scanning signals and output coupled signals; or the second strip electrodes are loaded with the touch scanning signals, the first strip electrodes couple voltage signals of the touch scanning signals and output the coupled signals.

17 Claims, 6 Drawing Sheets

(58) Field of Classification Search
CPC .......... G06F 3/042; G09G 5/00; G01R 27/26; G06K 11/06; G08C 21/00
USPC .......................................................... 345/173
See application file for complete search history.

(56) References Cited

U.S. PATENT DOCUMENTS

2015/0177878 A1* 6/2015 Cheng ..................... G06F 3/044
 345/174

2015/0205428 A1* 7/2015 Wang ...................... G06F 3/044
 345/174

FOREIGN PATENT DOCUMENTS

| | | |
|---|---|---|
| CN | 103576998 A | 2/2014 |
| CN | 203535621 U | 4/2014 |
| CN | 104076998 A | 10/2014 |
| CN | 203882297 U | 10/2014 |
| CN | 104536634 A | 4/2015 |
| JP | 2011-138154 A | 7/2011 |
| TW | 201439853 A | 10/2014 |

OTHER PUBLICATIONS

International Search Report & Written Opinion Appln. No. PCT/CN2015/079631; dated Mar. 11, 2015.
Second Chinese Office Action dated Apr. 21, 2017; Appln. No. 201510038860.9.
The Third Chinese Office Action dated Jul. 21, 2017; Appln. No. 201510038860.9.

* cited by examiner

TOUCH SCREEN AND DISPLAY APPARATUS WITH WAVY SHAPED STRIP ELECTRODES

TECHNICAL FIELD

The present disclosure relates to a touch screen and a display apparatus.

BACKGROUND

At present, an existing capacitive touch screen realizes detection of a finger touch position on a principle of mutual capacitance. For example, a pattern of a touch structure is added in a touch screen. Specifically, the pattern of the touch structure usually includes a plurality of strip transparent touch drive electrodes and a plurality of strip transparent touch sensing electrodes, which are arranged on different layers and intersect with one another. In the two layers of transparent electrode structures of the touch structure, straight-line edges of respective strip electrodes on an upper layer easily interact with a regular pattern, for example a pattern of a black matrix layer, in a pixel structure of the touch screen to generate light interference, which causes moire patterns, and thus affects display quality of the touch screen.

SUMMARY

Embodiments of the present disclosure provide a touch screen and a display apparatus, thereby eliminating visibility of moire patterns on a surface of the touch screen and improving display quality of the touch screen.

According to one aspect, an embodiment of the present disclosure provides a touch screen, comprising a plurality of first strip electrodes extending in a first direction, and a plurality of second strip electrodes extending in a second direction different from the first direction and positioned on a layer different from that of the first strip electrodes. Each first strip electrode has a wavy structure, and the wavy structure has two wavy shaped edges; each wavy shaped edge includes a plurality of polylines, and an included angle between an extending direction of each polyline and the first direction is an acute angle.

In one possible implementation mode, in a touch period, at least part of the first strip electrodes are loaded with touch scanning signals, and the second strip electrodes couple voltage signals of the touch scanning signals and output coupled signals; or, in the touch period, the second strip electrodes are loaded with the touch scanning signals, and at least part of the first strip electrodes couple voltage signals of the touch scanning signals and output the coupled signals.

In one possible implementation mode, corresponding polylines of two wavy shaped edges of each first strip electrode are in mirror symmetry with respect to the first direction.

In one possible implementation mode, corresponding polylines of two wavy shaped edges of each first strip electrode are parallel to each other.

In one possible implementation mode, an included angle between the polyline and the first direction is greater than or equal to 10° and less than or equal to 45°.

In one possible implementation mode, corresponding polylines of two adjacent wavy shaped edges of two adjacent first strip electrodes are parallel to each other.

In one possible implementation mode, an interval between corresponding polylines of the two adjacent wavy shaped edges of the two adjacent first strip electrodes is greater than or equal to 4 μm and less than or equal to 20 μm.

In one possible implementation mode, the first strip electrodes include a plurality of first touch electrodes of strip shape and a plurality of floating electrodes, which are arranged alternately and insulate from each other, and the floating electrodes are floating and are loaded with no electric signal; in a touch period, in a case that the second strip electrodes couple voltage signals of the touch scanning signals and output the coupled signals, the first touch electrodes are loaded with the touch scanning signals; or in the touch period, in a case that the second strip electrodes are loaded with the touch scanning signals, the first touch electrodes couple voltage signals of the touch scanning signals and output the coupled signals.

In one possible implementation mode, each floating electrode is divided into a plurality of block floating sub-electrodes.

In one possible implementation mode, in a same floating electrode, dividing lines between respective block floating sub-electrodes are parallel with the second direction; or the dividing lines and the second direction have a preset included angle.

In one possible implementation mode, in the same floating electrode, the dividing lines between the respective block floating sub-electrodes are parallel with the second direction and are positioned in different straight lines.

In one possible implementation mode, in the same floating electrode, dividing lines, corresponding to two adjacent second strip electrodes, between the respective block floating sub-electrodes are in mirror symmetry with respect to the second direction.

In one possible implementation mode, the touch screen provided by the embodiment of the present disclosure further comprises: a counter substrate and an array substrate opposite to each other; and a plurality of pixel units arranged in array between the counter substrate and the array substrate; the first strip electrodes are positioned on a side of the counter substrate away from the array substrate, or positioned on a side of the counter substrate facing the array substrate, and the respective first strip electrodes correspond to at least two columns or two rows of pixel units.

In one possible implementation mode, the touch screen further comprises common electrodes, positioned on a side of the counter substrate facing the array substrate or on a side of the array substrate facing the counter substrate, and the second strip electrodes and the common electrodes are arranged on a same layer. Or, the second strip electrodes are positioned on a side of the array substrate facing the counter substrate and multiplexed as common electrodes.

According to another aspect, a display apparatus provided by an embodiment of the present disclosure comprises the touch careen provided by the embodiment of the present disclosure.

In the touch screen and the display apparatus provided by the embodiments of the present invention, since two edges of a first strip electrode are set to be in wavy shape, an interference phenomenon caused by interaction between straight-line edges of a first strip electrode and a regular pattern in a pixel structure in prior art is reduced, and moire patterns caused thereby is also reduced, so as to eliminate visibility of the moire patterns on a surface of the touch screen and improve display quality of the display screen.

BRIEF DESCRIPTION OF THE DRAWINGS

In order to clearly illustrate technical solutions in the embodiments of the present disclosure, drawings required in the embodiments are briefly introduced, and it is obvious for those skilled in the art that the drawings described hereinafter are only some embodiments of the present disclosure, and other drawings can also be obtained according to these drawings without inventive effort.

FIG. 1b is an enlarged diagram at a position A in FIG. 1a;

DETAILED DESCRIPTION

Figure 1A:
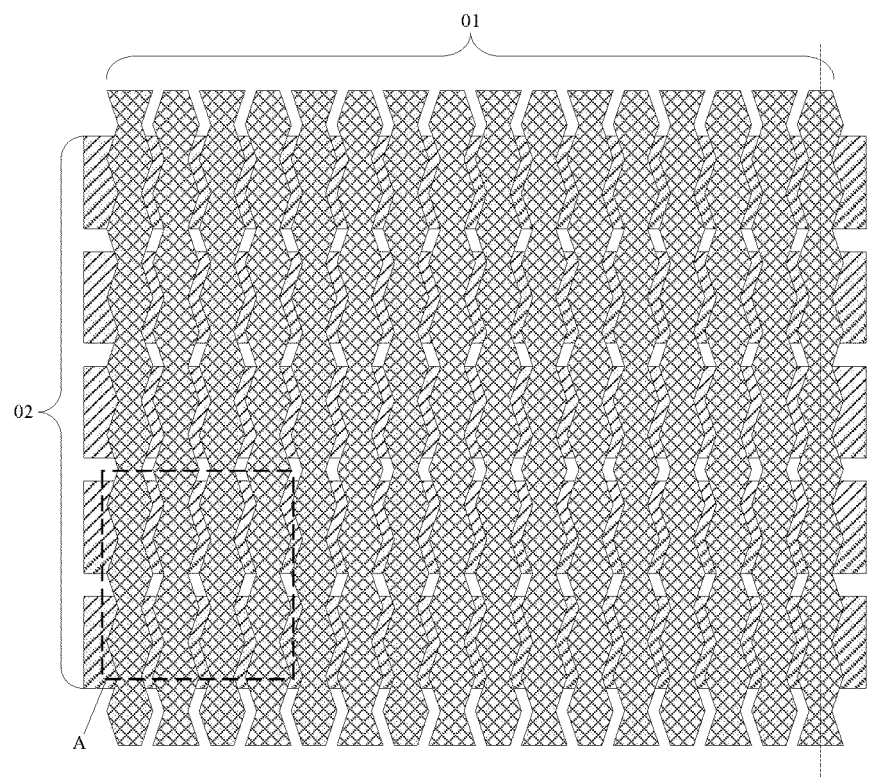
FIG. 1a is a top view of a touch screen provided by a first embodiment of the present invention.

The technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, technical terms or scientific terms used herein have ordinary meanings understood by a person of ordinary skill in the art of the present disclosure. "First", "second" and similar words in the description and claims of the present disclosure do not indicate any sequence, quantity or importance, but only intend to differentiate different composite parts. Similarly, "one" or "a/an" and other similar words mean at least one instead of quantitative limitation. "Connected" or "linked" or similar words are not limited to physical or mechanical connection, and may comprise electrical connection, either direct or indirect connection. "Upper", "lower", "left", and "right" only show relative positional relationships, which change correspondingly after absolute positions of the described objects have changed. Thicknesses and shapes of respective film layers in the drawings do not reflect a real proportion and only intend to explain the content of the present invention.

A first embodiment of the present invention provides a touch screen. As illustrated in FIG. 1a, the touch screen includes: a plurality of first strip electrodes 01, and a plurality of second strip electrodes 02 intersecting with the first strip electrodes 01 and positioned on a layer lower than that of the first strip electrodes 01. For example, in FIG. 1a, an extending direction of the first strip electrodes 01 is a vertical direction, and an extending direction of the second strip electrodes 02 is a horizontal direction.

Each first strip electrode 01 has a wavy structure along the extending direction, that is to say, the first strip electrode 01 has two wavy shaped edges along the extending direction, each wavy shaped edge includes a plurality of polylines, and an angle of an extending direction of each polyline with respect to the whole extending direction (for example, the vertical direction as illustrated in FIG. 1a) of the first strip electrode 01 is an acute angle.

In a touch period, at least part of the first strip electrodes 01 are loaded with touch scanning signals, and the second strip electrodes 02 couple voltage signals of the touch scanning signals and output signals; that is to say, at least part of the first strip electrodes 01 serve as touch driving electrodes, and correspondingly, the second strip electrodes 02 serve as touch sensing electrodes. Or, in the touch period, the second strip electrodes 02 are loaded with the touch scanning signals, and at least part of the first strip electrodes 01 couple voltage signal of the touch scanning signals and output signals; that is to say, the second first strip electrodes 02 serve as touch driving electrodes, and correspondingly, at least part of the first strip electrodes 01 serve as the touch sensing electrodes.

In the touch screen provided by the embodiment of the present invention, since two edges of each first strip electrode are set to be in a wavy shape, an interference phenomenon caused by interaction between straight-line edges of the first strip electrode and a regular pattern in a pixel structure in prior art is reduced, and moire patterns caused thereby is also reduced, so as to eliminate visibility of the moire patterns on a surface of the touch screen and improve display quality of the display screen.

In one example of the touch screen provided by the first embodiment of the present invention, in order to ensure that a pattern of the first strip electrodes 01 positioned on an upper layer of the touch screen is not seen by a user, namely, realize invisibility of the pattern of the first strip electrodes 01, as illustrated in FIG. 1a, the respective first strip electrodes 01 arranged on the same layer have a substantively uniform pattern. For example, the wavy shapes of two edges of the first strip electrode 01 can be in mirror symmetry with respect to the extending direction of the first strip electrode 01, that is to say, the wavy shapes of the two edges of the first strip electrode 01 in FIG. 1a with respect to the vertical direction, namely a dotted line direction in FIG. 1a, are in mirror symmetry.

Figure 2:
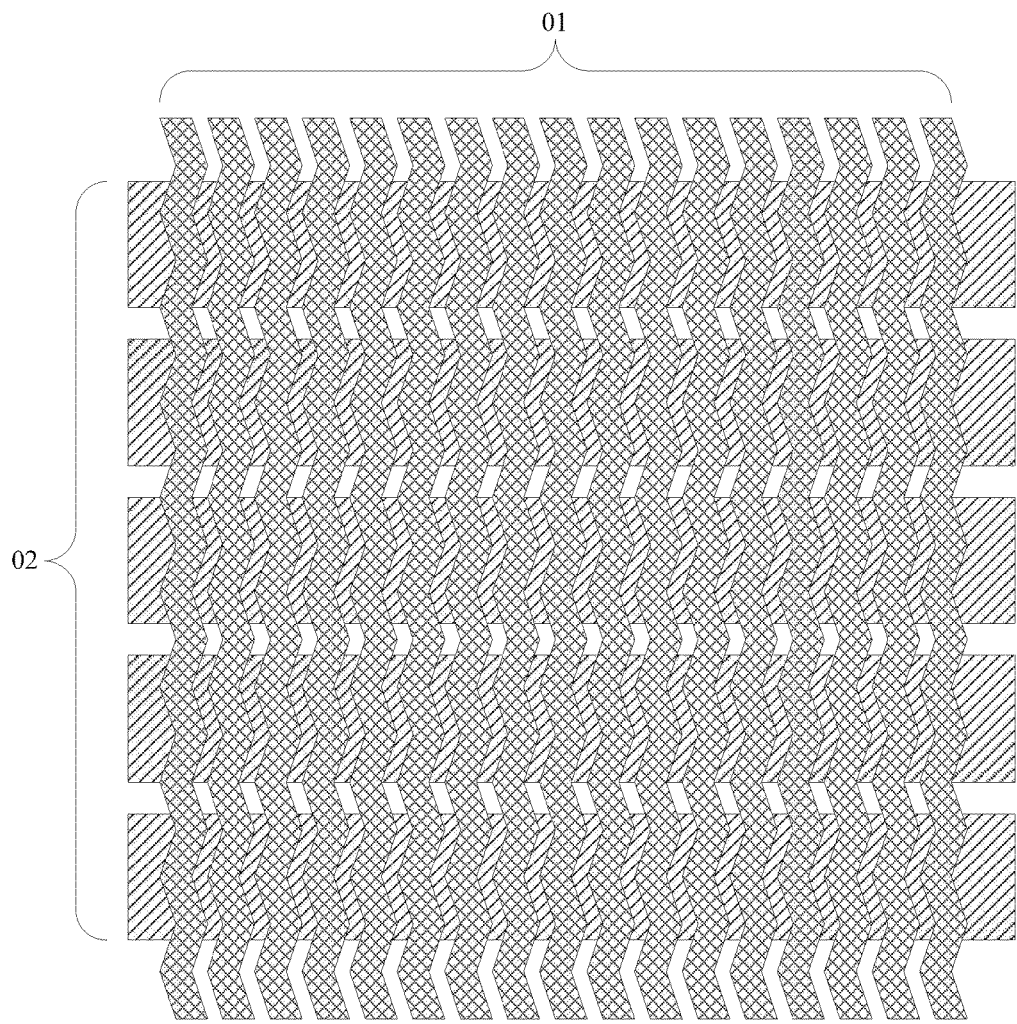
FIG. 2 is a top view of a touch screen provided by a second embodiment of the present invention.

In a second embodiment of the present invention, as illustrated in FIG. 2, wavy shapes of two edges of respective first strip electrodes 01 in the extending direction are parallel to each other, that is to say, in FIG. 2, respective polylines of the wavy shapes of two side edges of the respective first strip electrodes 01 are consistent in direction.

It should be noted that with respect to the structure as illustrated in FIG. 2, the structure as illustrated in FIG. 1 is higher in pattern randomness in the horizontal direction, and is relatively easy to eliminate transverse moire patterns.

Figure 1B:
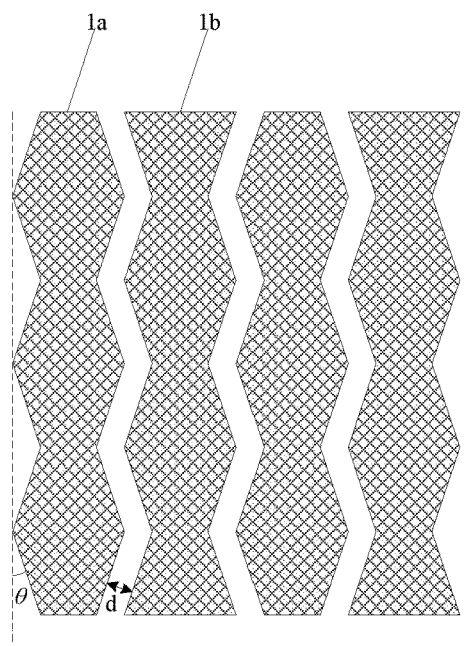

In the touch screen provided by the first embodiment of the present invention, as illustrated in FIG. 1b which is an enlarged drawing of a position A in FIG. 1a, when an included angle between each polyline forming the wavy shape and the extending direction of the first strip electrode, namely the dotted line direction, is greater than or equal to 10° and less than or equal to 45°, each first strip electrode 01 has a better effect of eliminating moire patterns.

In one example of the touch screen provided by the first and second embodiments, the smaller the interval between two adjacent first strip electrodes 01 is, the better the effect of eliminating moire patterns is. Therefore, as illustrated in FIG. 1b, for example, two opposed wavy shaped edges of two adjacent first strip electrodes 01 are set to be parallel, that is to say, intervals d of respective positions between the wavy structures of adjacent first strip electrodes 1a and 1b in FIG. 1b are constant.

For example, according to current manufacturing process parameters, the interval d of the opposed wavy shaped edges of two adjacent first strip electrodes is set to be greater than or equal to 4 μm and less than or equal to 20 μm, which is favorable for eliminating moire patterns.

In a touch screen provided by a third embodiment of the present invention, in order to avoid mutual interference of signals loaded among the first strip electrodes 01 in a touch period, the first strip electrodes 01 arranged on the same layer can be divided into first touch electrodes 011 and floating electrodes 012 which are mutually insulated, as illustrated in FIG. 3a-FIG. 3d.

In the touch period, the second strip electrodes 02 couple voltage signals of touch scanning signals and output signals, and the first touch electrodes 011 are loaded with the touch scanning signals; or, in the touch period, the second strip electrodes 02 are loaded with the touch scanning signals, and the first touch electrodes 011 couple the voltage signals of the touch scanning signals and output signals. In the touch period, respective floating electrodes 012 are floated, that is, are loaded with no electric signal, and the floating electrodes 012 can shield electric signal interference among the first touch electrodes 011.

It should be noted that, "mutually insulated" in above expression means mutual insulation between the first touch electrodes 011 and the floating electrodes 012, while respective first touch electrodes 011 can be mutually electrically connected as required. For example, the first touch electrodes 011 and the floating electrodes 012 may have a plurality of arrangement orders, for example, as illustrated in FIG. 3a to FIG. 3d, two first touch electrodes 011 and two floating electrodes 012 are alternately arrayed. Other arrangement manners may also be adopted, which is not limited herein.

Figure 3A:
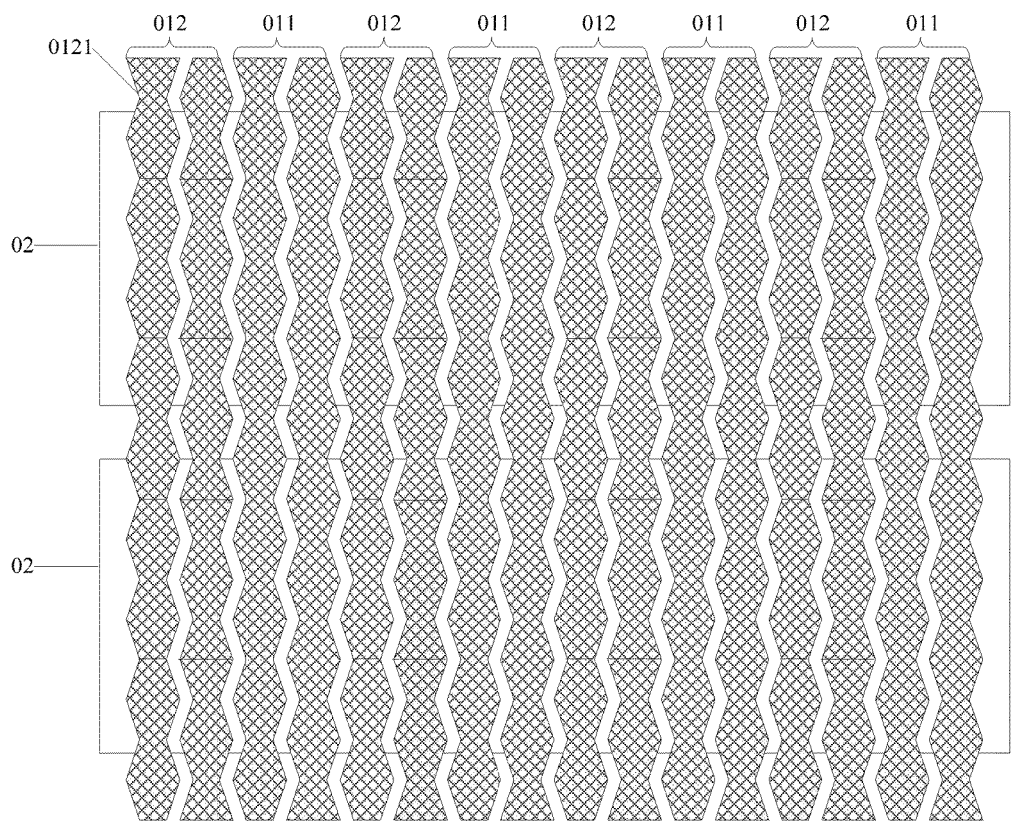
FIG. 3a-FIG. 3d are top views of a touch screen provided by a third embodiment of the present invention.
Figure 3B:
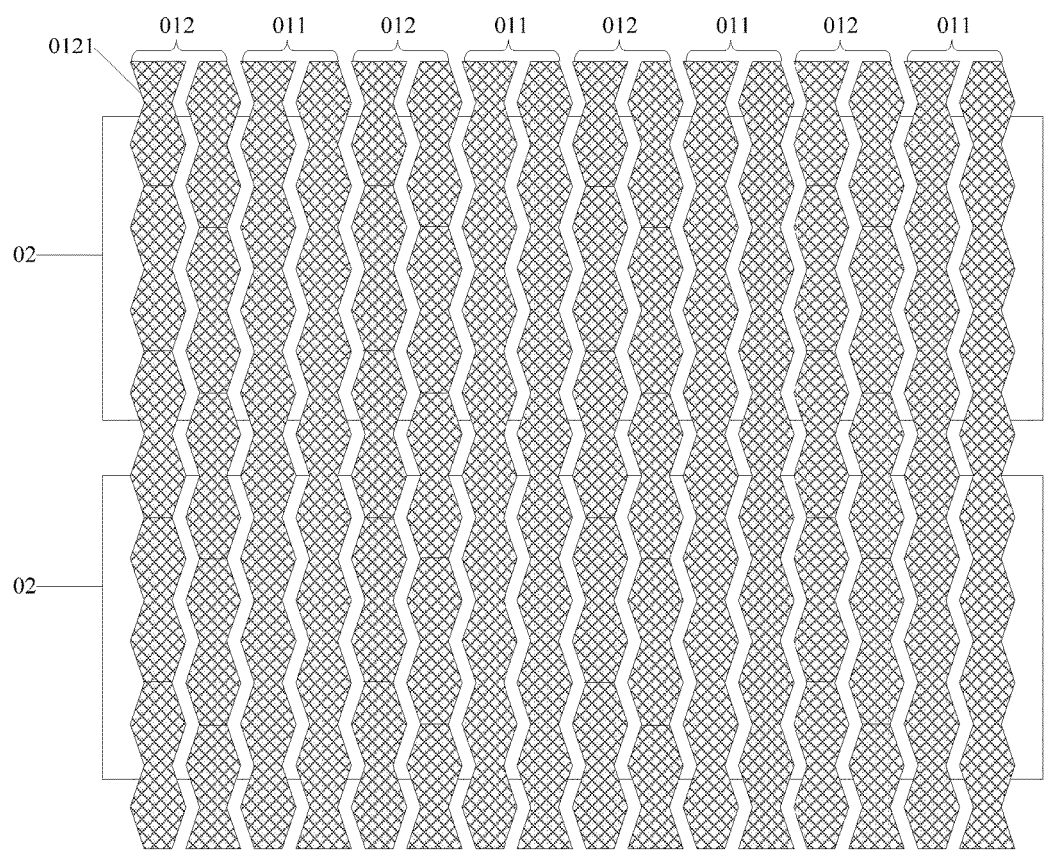
Figure 3C:
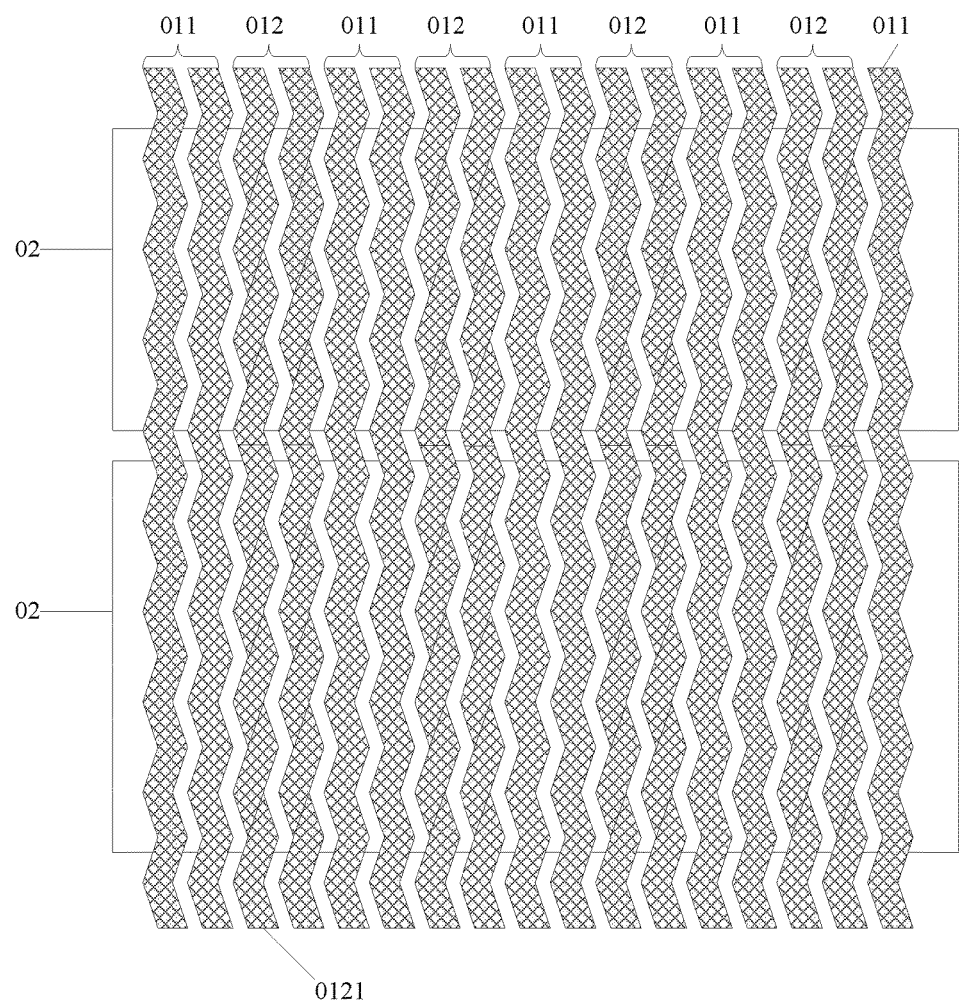
Figure 3D:
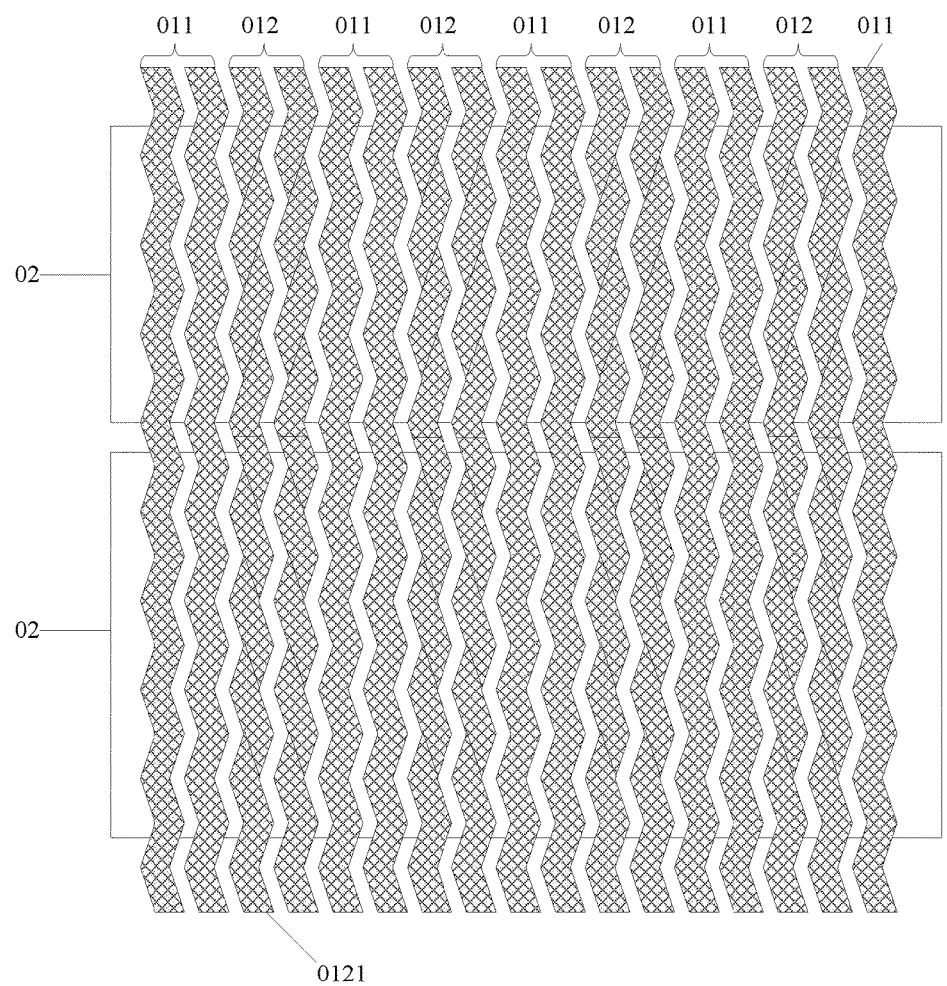

In the touch screen provided by the third embodiment of the present invention, respective floating electrodes 012 are further divided into a plurality of block floating sub-electrodes 0121, as illustrated in FIG. 3a-FIG. 3d. Respective floating electrodes 012 can be divided into the block floating sub-electrodes 0121 in various ways. For example, as illustrated in FIG. 3a and FIG. 3b, in the same floating electrode 012, dividing lines between respective block floating sub-electrodes 0121 are parallel with the extending direction of the second strip electrodes 02. Also as illustrated in FIG. 3c and FIG. 3d, there is a preset included angle between the dividing lines between the respective block floating sub-electrodes 0121 and the extending direction of the second strip electrodes 02, namely, the dividing lines are oblique lines.

Further, in the same floating electrode 012, respective dividing lines of two adjacent floating electrodes 012 can be positioned in the same straight line as illustrated in FIG. 3a, or may be positioned in different straight lines as illustrated in FIG. 3b. As illustrated in FIG. 3b, the respective dividing lines of two adjacent floating electrodes 012 are distributed in a step-like manner, that is to say, when the respective dividing lines are not designed along a same straight line, possibility of occurrence of transverse moire patterns can be further avoided, which is favorable for improving picture quality.

In addition, further, in order to further eliminate the moire patterns brought by pattern consistence, as illustrated in FIG. 3d, in the same floating electrode 012, the dividing lines between respective block floating sub-electrodes 0121 and corresponding to two adjacent second strip electrodes 02 are set to be in mirror symmetry with respect to the extending direction of the second strip electrodes 02; that is, in the same floating electrode, included angles between the dividing lines between respective block floating sub-electrodes 0121 of two upper and lower second strip electrodes 02 as illustrated FIG. 3d and the horizontal direction are equal but opposite in direction.

During actual implementation, the touch screen provided by the embodiments of the present invention may be an in cell touch screen, an on cell touch screen or a mixed-type touch screen, which is not limited herein.

Specifically, the touch screen provided by the embodiments of the present disclosure comprises a counter substrate and an array substrate opposite to each other. The first strip electrodes 01 are arranged on a side of the counter substrate away from the array substrate, namely, the first strip electrodes 01 are arranged on an outer side of the counter substrate. Hence, when at least part of the first strip electrodes 01 serve as touch sensing electrodes, the touch screen is more sensitive to change of a finger touch signal. Or, the first strip electrodes 01 are arranged on a side of the counter substrate facing the array substrate, namely, the first strip electrodes 01 are arranged on an inner side of the counter substrate, thus facilitating thinning treatment of the whole touch screen.

In addition, further, in the touch screen provided by the embodiments of the present invention, a plurality of pixel units are arranged in array between the counter substrate and the array substrate. In order to ensure that the wavy structures of respective strip electrodes 01 can better eliminate a moire pattern effect, the respective first strip electrodes 01 correspond to at least two columns or two rows of pixel units, that is to say, first strip electrodes 01 extending longitudinally correspond to the at least two columns of pixel units, and first strip electrodes 01 extending transversely correspond to the at least two rows of pixel units.

Further, the touch screen provided by the embodiments of the present invention further includes: common electrodes positioned on a side of the counter substrate facing the array substrate or on a side of the array substrate facing the counter substrate. In order to reduce process steps when the touch screen is manufactured, the second strip electrodes 02 and the common electrodes can be arranged on the same layer; or, the second strip electrodes 02 are positioned on a side of the array substrate facing the counter substrate and multiplexed as common electrodes.

An embodiment of the present invention further provides a display apparatus, including the touch screen provided by the embodiments of the present invention. The display apparatus includes a cellphone, a tablet computer, a television, a display, a laptop computer, a digital frame, a navigator and any products or parts with a display function. Implementation of the display apparatus may refer to the embodiments of the touch screen, which is not repeated herein.

The embodiments of the invention provide a touch screen and a display apparatus, including first strip electrodes and second strip electrodes which are arranged intersecting with each other on different layers. A first strip electrode positioned on an upper layer of the second strip electrode has a wavy structure, namely, edges on both sides of the first strip electrode have wavy shapes including a plurality of polylines, and an included angle between an extending direction of each polyline forming the wavy shape and the whole extending direction of the first strip electrode is an acute angle. In a touch period, at least part of the first strip electrodes are loaded with touch scanning signals, and the second strip electrodes couple voltage signals of the touch scanning signals and output signals; or, in the touch period, the second strip electrodes are loaded with the touch scanning signals, and at least part of the first strip electrodes couple voltage signals of the touch scanning signals and output signals. Since two edges of each first strip electrode are set to be in wavy shape, an interference phenomenon caused by interaction between straight-line edges of a first strip electrode and a regular pattern in a pixel structure in prior art is reduced, and moire patterns caused thereby is also reduced, so as to eliminate visibility of the moire patterns on a surface of the touch screen and improve display quality of the display screen.

Above embodiments only intend to be illustrative rather than limitative of the present disclosure, and a person of ordinary skill in related arts can make various alternations and transformations without departing from the spirit and scope of the present disclosure. Therefore, all equivalent technical solutions also belong to the scope of the present disclosure, and a patent protection scope of the present disclosure is defined by appending claims.

The invention claimed is:

1. A touch screen, comprising: a plurality of first strip electrodes extending in a first direction, and a plurality of second strip electrodes extending in a second direction different from the first direction and positioned on a layer different from that of the first strip electrodes; wherein,
   each first strip electrode has a wavy structure, and the wavy structure has two wavy shaped edges; each wavy shaped edge includes a plurality of polylines, and an included angle between an extending direction of each polyline and the first direction is an acute angle;
   wherein, the first strip electrodes include a plurality of first touch electrodes of strip shape and a plurality of strip floating electrodes, which are arranged alternately and insulate from each other;
   wherein each floating electrode is divided into a plurality of block floating sub-electrodes; and
   in the same floating electrode, dividing lines between the respective block floating sub-electrodes and corresponding to two adjacent second strip electrodes are in mirror symmetry with respect to the second direction.

2. The touch screen according to claim 1, wherein, in a touch period, at least part of the first strip electrodes are loaded with touch scanning signals, and the second strip electrodes couple voltage signals of the touch scanning signals and output coupled signals;
   or, in the touch period, the second strip electrodes are loaded with the touch scanning, signals, and at least part of the first strip electrodes couple voltage signals of the touch scanning signals and output the coupled signals.

3. The touch screen according to claim 2, wherein, the floating electrodes are floating and are loaded with no electric signal;
   in a touch period, in a case that the second strip electrodes couple voltage signals of the touch scanning signals and output the coupled signals, the first touch electrodes are loaded with the touch scanning signals; or in the touch period, in a case that the second strip electrodes are loaded with the touch scanning signals, the first touch electrodes couple voltage signals of the touch scanning signals and output the coupled signals.

4. The touch screen according to claim 2, wherein, corresponding polylines of two wavy shaped edges of each first strip electrode are in mirror symmetry with respect to the first direction.

5. The touch screen according to claim 2, wherein, corresponding polylines of two wavy shaped edges of each first strip electrode are parallel to each other.

6. The touch screen according to claim 2, wherein, an included angle between the polyline and the first direction is greater than or, equal to 10° and less than or equal to 45°.

7. The touch screen according to claim 2, wherein, corresponding polylines of two adjacent wavy shaped edges of two adjacent first strip electrodes are parallel to each other.

8. The touch screen according to claim 2, further comprising: a counter substrate and an array substrate opposite to each other; and a plurality of pixel units arranged in array between the counter substrate and the array substrate;
   the first strip electrodes are positioned on a side of the counter substrate away from the array substrate, or positioned on a side of the counter substrate facing the array substrate, and the respective first strip electrodes correspond to at least two columns or two rows of pixel units.

9. The touch screen according to claim 1, wherein, corresponding polylines of two wavy shaped edges of each first strip electrode are in mirror symmetry with respect to the first direction.

10. The touch screen according to claim 1, wherein, corresponding polylines of two wavy shaped edges of each first strip electrode are parallel to each other.

11. The touch screen according to claim 1, wherein, an included angle between the polyline and the first direction is greater than or equal to 10° and less than or equal to 45°.

12. The touch screen according to claim 1, wherein, corresponding polylines of two adjacent wavy shaped edges of two adjacent first strip electrodes are parallel to each other.

13. The touch screen according to claim 12, wherein, an interval between corresponding polylines of the two adjacent wavy shaped edges of the two adjacent first strip electrodes is greater than or equal to 4 μm and less than or equal to 20 μm.

14. The touch screen according to claim 1, further comprising: a c an array substrate opposite to each other; d a plurality of pixel between the counter substrate and the array substrate;
   the first strip electrodes are positioned on a side of the counter substrate away from the array substrate, or positioned on a side of the counter substrate facing the array substrate, and the respective first strip electrodes correspond to at least two columns or two rows of pixel units.

15. The touch screen according to claim 14, wherein, the touch screen further comprises common electrodes, positioned on a side of the counter substrate facing the array substrate or on a side of the array substrate facing the counter substrate, and the second strip electrodes and the common electrodes are arranged on a same layer; or,
   the second strip electrodes are positioned on a side of the array substrate facing the counter substrate and multiplexed as common electrodes.

16. A display apparatus, comprising the touch screen according to claim 1.

17. The touch screen according to claim 1, wherein in a same floating electrode, each dividing line between respective block floating sub-electrodes not only have a non-zero preset included angle with the first direction, but also have a non zero preset included angle with the second direction.

* * * * *